May 9, 1939.  H. J. TROCHE  2,157,153

NIGGERHEAD

Filed Aug. 14, 1936

INVENTOR.
HERMAN J. TROCHE
BY Bates, Gohrick, & Teare
ATTORNEYS

Patented May 9, 1939

2,157,153

UNITED STATES PATENT OFFICE 2,157,153

NIGGERHEAD

Herman J. Troche, Cleveland, Ohio, assignor to American Coach and Body Company, Cleveland, Ohio, a corporation of Ohio Application August 14, 1936, Serial No. 96,122

6 Claims. (Cl. 254—150)

The present invention is an improvement in winding apparatus commonly known as a niggerhead and the principal object is to provide an improved niggerhead which is adapted to be detachably coupled with a power shaft.

A specific object is to provide a simple, strong and inexpensive niggerhead which will not readily become detached from the drive shaft, although coupled therewith in a quickly detachable manner.

Other objects and features will become apparent from the following description relating to the accompanying drawing. The essential characteristics are summarized in the claims.

Figure 1:
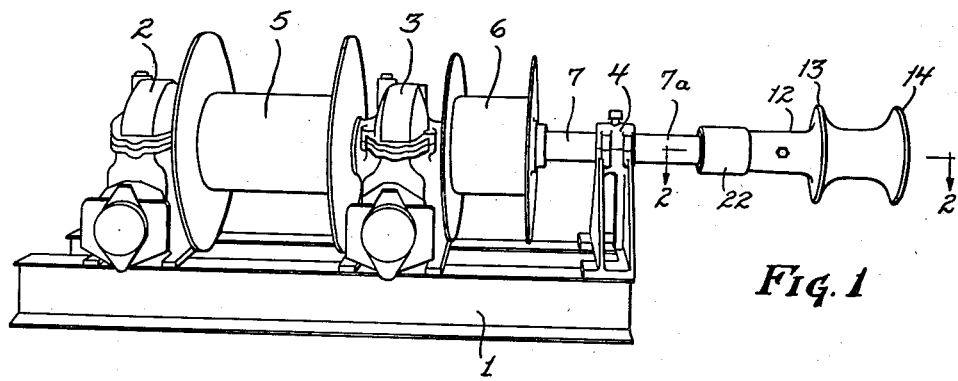
Figure 2:
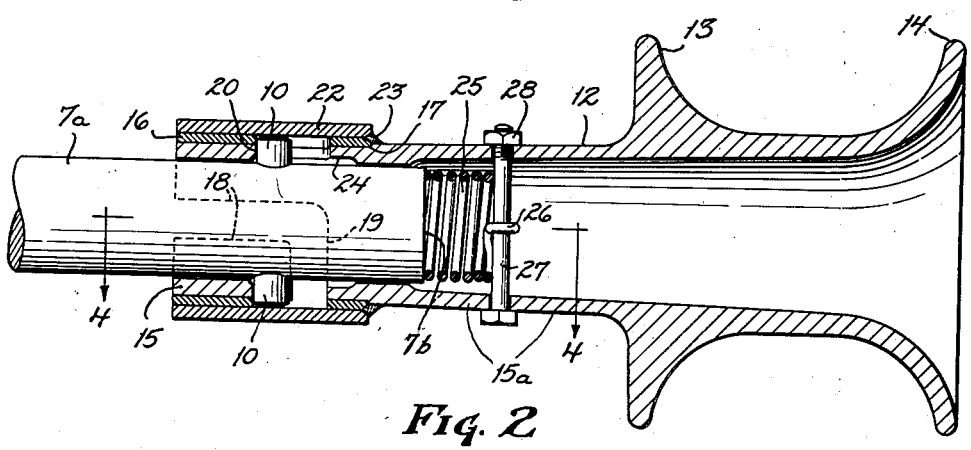
Figure 3:
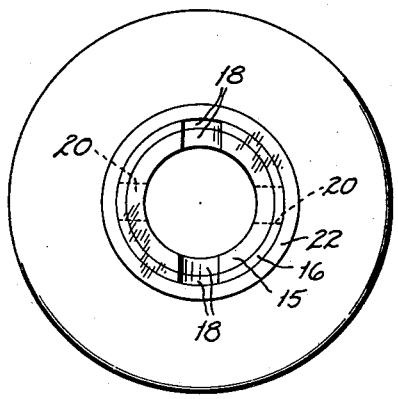
Figure 4:
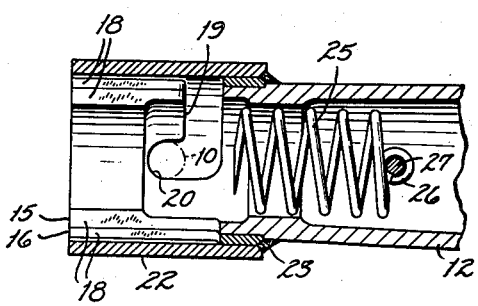

Referring to the drawing, Fig. 1 is a perspective view of a compound power winch, with a niggerhead, incorporating the invention hereof, attached to a power shaft of the winch; Fig. 2 is a central sectional view, through the niggerhead showing in side elevation an end portion of the power shaft; Fig. 3 is an end elevation of the niggerhead, and Fig. 4 is a fragmentary central sectional view, through the attachment end of the niggerhead taken as indicated by the line 4—4 on Fig. 2.

In the use of winches of the windlass type adapted for power utility work, as for pole erection, it is frequently necessary to pull cables, drag poles, or to lift heavy objects by means which are separate from the winch drum; and when such necessity arises it is important that the additional apparatus be adapted for quick coupling with the power mechanism of the winch. After use, it is just as desirable that the additional apparatus be quickly uncoupled from the winch mechanism for proper storage, as on a truck, on which the mechanism may be mounted. Broadly, detachable niggerheads for power shafts, in such equipment, are old. However, as heretofore used, to my knowledge, a frequent source of trouble arose from the fact that the niggerhead has had a tendency to come off the power shaft, particularly when a cable attached thereto extends at an angle other than normal to the shaft and when the direction of rotation of the shaft is abnormal. The present arrangement has been designed to overcome the above mentioned difficulty and to solve other problems having to do with simplification strengthening of parts, etc. as will be explained below.

Referring again to the drawing, and first to Fig. 1, a framework is indicated at 1, which is adapted to be carried on the chassis of a truck or other vehicle. Erected on the framework are suitable supports 2, 3 and 4, for the driving and supporting shafting of a pair of drums, indicated at 5 and 6. In the particular arrangement shown, the apparatus indicated at 2 is a power take-off unit, adapted to be driven from the usual truck drive and motor, the unit 2 being for supplying power to the drum 5. The apparatus 3 is a similar unit for the drum 6. The units 2 and 3 are independently driven and controlled, so that, for example, the larger drum 5 may carry the main cable for lifting poles, and the drum 6 may carry a suitable cable for operating a derrick or boom. The shaft 7 which drives the drum 6, is suitably coupled to the unit 3 and extends through the structure 4, overhanging it at 7a. This overhung end of the shaft is provided, as shown in Fig. 2, with a pair of outwardly projecting cylindrical pins 10, formed as by a single crosspin tightly carried in a transverse bore in the shaft, or formed in any other manner.

The niggerhead construction comprises, as shown, a tubular body 12, having flanges 13 and 14 thereon preferably integral therewith and forming a drum, as is usual in devices of this type.

The wall of the inner end portion 15 of the tubular body 12 which fits over the shaft, is somewhat thickened with reference to the intermediate tapered portion 15a, and both its inside and outside diameters are relatively reduced. The reduced portion telescopes the end portion of the shaft 7a with sufficient clearance so that an operator can, by hand, easily and quickly attach the body to the shaft. The gradual reduction in diameter from the inner flange to the portion 15 is principally to facilitate making the body as a metal casting, i. e., providing draft, etc. The thickened wall in the general zone of the cross pin 10 is provided, in part, by a relatively hard machine finished metal sleeve 16, which may be shrunk or pressed onto the inner end of the tube portion 15, as against a shoulder 17.

The entrance passages 18 for the pins 10 lie on diametrically opposite sides of the effective tube end, and preferably pass through both the portion 15 of the tube and the sleeve 16, as indicated in Figs. 3 and 4,—see also broken lines at 18 in Fig. 2. These passages or slots branch in the same circumferential direction from the respective slot portions 18, as at 19. The closed portions of the slots extend axially from the slot portions 19 a sufficient distance so that when the pins are seated therein (note Fig. 4) the centers of the pins 10 lie outwardly from the adjacent walls of the circumferential portions 19 of the slots. In other words, the depth of the closed ends 20 of the slots, with reference to the slot portions 19, is greater than half the diameters of the pins. Thus, the pins cannot cam themselves out of position, as would be the case if the pin seats (slot portions 20) were shallow.

In order further to reenforce the end of the device which engages the shaft and which is necessarily weakened by the slots, as well as to conceal the slots and pins, I provide an imperforate collar or sleeve 22 which bridges the slots and which may be secured in place as by welding at 23; the weld, in fact, securing all the parts 12, 16 and 22 rigidly together.

For preventing binding in the region of the slots, as by reason of foreign matter scraped off the shaft or pin, clearance is afforded in said region by an undercut or local enlargement of the tube diameter at 24.

In order to hold the pins in engagement with the slot extensions 20, I provide a coiled, compression spring 25 within the tubular body 12. The spring is retained in position partly by the tube wall for engagement with the effective end of the shaft, as at 7b, Fig. 2. The outer end of the spring is formed into a loop 26, which embraces a cross-pin or bolt 27, secured to the tube as shown in Fig. 2 by a suitable nut 28 threaded on the bolt.

It will be seen that when the occasion demanding use of the device arises, the operator takes the device from its stored position, slips the end of the tube over the shaft portion 7a causing the slot entrances 18 to align with the pins, then shoves the device toward the shaft until the pins abut the slot portions 19 (compressing the spring 25), then turns the device until the pins abut the walls of the slot portions 20 and then releases the entire device, whereupon the expanding force of the spring seats the pins to final driving position (Figs. 3 and 4). Detachment is accomplished by just the reverse of the procedure described. The device is exceptionally strong and the working parts are fully guarded against accidental damage.

I claim:

1. A niggerhead having a hollow body adapted to fit over a driving shaft, said body having a slot for engaging a lateral projection on such shaft, which projection is circular in cross-section, the slot having a circumferential portion terminating in a projection receiving recess extending from said portion lengthwise of the body for a distance greater than half the diameter of the projection and arranged in close fitting contact with opposite sides of the projection so as to serve as a two-way, positive driving spline connection between the body and shaft.

2. A niggerhead comprising a metal casting having flanges forming a drum portion and a tube adapted detachably to fit over a driving shaft, the tube having a bayonet-lock slot formation to receive a pin on the shaft in a manner to form a positive driving connection therewith when the pin occupies an inner end portion of the slot, and a steel collar surrounding the slotted portion, laterally concealing the slot and reinforcing the tube where slotted.

3. A quickly detachable niggerhead for the power shaft of a winch, comprising a cast metal body having flanges which form a reel and a tubular extension which is tapered to facilitate formation by casting, said extension being adapted to fit over a shaft, a sleeve on the extension having a slot through its wall adapted closely to engage opposite sides of a driving pin on such shaft as a positive driving connection, and a reinforcing sleeve of material which is stronger than the cast metal surrounding the slotted sleeve and laterally concealing its slot, the sleeves and extension being rigidly secured together.

4. A niggerhead adapted to be coupled detachably to a shaft, said niggerhead comprising a tubular body adapted detachably to fit over the shaft, the body including a hardened sleeve having a bayonet-lock slot extending through its wall and intercepting an end of the sleeve so as to receive a pin on the shaft, and a reinforcing sleeve continuously surrounding the slotted portion of the aforesaid sleeve and laterally concealing the slot.

5. A niggerhead comprising a hollow metal body having a tubular extension adapted to fit over a shaft, and having a slot adapted to engage a driving pin on such shaft, the slot having an axially extending portion into which the pin seats, a coiled compression spring carried within the body and adapted to engage the end of the shaft to maintain the pin seated, and a cross pin in the body to which the spring is attached.

6. The combination of a driving shaft having a laterally projecting pin, a niggerhead having a drum portion and a tubular portion, the latter fitting substantially closely over the shaft, a bayonet lock type slot in the tubular portion adapted to receive the pin, and a circumferentially extending enlargement on the inside surface of the tubular portion in the vicinity of the slot for receiving foreign matter and preventing binding between the shaft and tubular portion, said close fitting relationship between the tubular portion and shaft being maintained at both ends of the enlargement.

HERMAN J. TROCHE.